(12) United States Patent
Chandhoke (10) Patent No.: US 6,980,869 B1
(45) Date of Patent: Dec. 27, 2005

(54) SYSTEM AND METHOD FOR USER CONTROLLABLE PID AUTOTUNING AND ASSOCIATED GRAPHICAL USER INTERFACE

(75) Inventor: Sundeep Chandhoke, Austin, TX (US)

(73) Assignee: National Instruments Corporation, Austin, TX (US)

(*) Notice: Subject to any disclaimer, the term of this patent is extended or adjusted under 35 U.S.C. 154(b) by 577 days.

(21) Appl. No.: 09/716,892

(22) Filed: Nov. 20, 2000

(51) Int. Cl.[7] ............................................. G05B 13/02
(52) U.S. Cl. ........................... 700/42; 700/28; 700/83; 700/86; 318/561; 318/609; 318/610; 318/568.1
(58) Field of Search .............................. 700/10, 37, 81, 700/28, 41–43, 83, 86; 715/711, 771; 318/609, 318/610, 561, 568.1

(56) References Cited

U.S. PATENT DOCUMENTS

| 4,407,013 | A | * | 9/1983 | Arcara et al. ................. 700/29 |
| 4,549,123 | A | * | 10/1985 | Hagglund et al. .......... 318/610 |
| 4,577,097 | A | * | 3/1986 | Keyes et al. ............. 250/214.1 |
| 4,602,326 | A | * | 7/1986 | Kraus .......................... 700/38 |
| 4,768,143 | A | * | 8/1988 | Lane et al. ................... 700/37 |
| 5,394,322 | A | * | 2/1995 | Hansen ........................ 700/37 |
| 5,691,896 | A | * | 11/1997 | Zou et al. ..................... 700/37 |
| 5,734,597 | A | * | 3/1998 | Molnar et al. .............. 708/112 |
| 5,748,467 | A | * | 5/1998 | Qin et al. ..................... 700/50 |
| 5,832,532 | A | * | 11/1998 | Kennedy et al. ............ 715/503 |
| 5,961,896 | A | * | 10/1999 | Koizumi et al. ............... 261/67 |
| 6,081,751 | A | | 6/2000 | Luo et al. |
| 6,198,246 | B1 | * | 3/2001 | Yutkowitz .................... 318/561 |
| 6,445,962 | B1 | * | 9/2002 | Blevins et al. ................ 700/37 |
| 6,510,353 | B1 | * | 1/2003 | Gudaz et al. ................. 700/37 |

OTHER PUBLICATIONS http://www.msl-datascan.com/orpid.htm, "Orchestrator Process and PID control," Measurement Systems Ltd., posted Feb. 14, 200.*

* cited by examiner

Primary Examiner—John Follansbee
Assistant Examiner—Aaron Perez-Daple
(74) Attorney, Agent, or Firm—Meyertons Hood Kivlin Kowert & Goetzel, P.C.; Jeffrey C. Hood; Mark S. Williams (57) ABSTRACT

A system and method for user configuration of an autotuning algorithm for a PID controller. User input is received via a Graphical User Interface (GUI) indicating a desired characteristic of a PID controller, such as stiffness or response time. The system is excited via a proportional controller to characterize the intrinsic behavior of the system, i.e., to calculate a system transfer function. An autotuning algorithm is configured in accordance with the user input. The configured autotuning algorithm is applied to the transfer function to generate gain values for the PID controller resulting in the PID controller characteristic specified by the user. The PID controller gains are loaded into the PID controller hardware or software, thereby configuring the PID controller to operate according to the desired characteristic specified by the user. The user may trigger and view a step response of the system to review the results of the tuning process.

14 Claims, 6 Drawing Sheets

Figure 1A

A First Embodiment of the PID Autotuning System of the Present Invention

Figure 1B

A Second Embodiment of the PID Autotuning System of the Present Invention

SYSTEM AND METHOD FOR USER CONTROLLABLE PID AUTOTUNING AND ASSOCIATED GRAPHICAL USER INTERFACE

FIELD OF THE INVENTION

The present invention relates to the automatic tuning of PID controllers, and in particular to a system and method for enabling a user to provide input characterizing the autotuning of a PID controller.

DESCRIPTION OF THE RELATED ART

Despite the development of more advanced control strategies, the majority of industrial control systems still use PID [Proportional-Integral-Derivative] controllers because they are standard industrial components, and their principle is well understood by engineers. Moreover, due to process uncertainties, a more sophisticated control scheme is not necessarily more efficient than a well-tuned PID controller. However, many controllers are poorly tuned, some too aggressively, and some too sluggishly. When the uncertainty in the disturbance or process dynamic characteristics is large, the tuning of a PID controller is often difficult, and the need for auto-tuning arises.

The most significant development for PID controller tuning can be dated back to the early work of Ziegler and Nichols (1942). Rather recently, many techniques have been proposed for the autotuning of PID controllers, such as relay feedback, pattern recognition techniques, and correlation techniques. A comprehensive survey of autotuning techniques and industrial products is provided in Astrom K. J., T. Hagglund, C. C. Hang and W. H. Ho (1993), Automatic Tuning and Adaptation for PID Controllers—A Survey, *Control Engineering Practice*, Vol. 1, pp. 669–714. The most recent approaches include the non-symmetrical optimum method and the online identification procedure based on the Laguerre series. Perhaps the most popular autotuning approach in industry and academic research is relay based autotuning, which switches off the existing controller and uses a relay to excite the process.

Generally, PID control systems form a PID control loop, which includes a PID controller and a process which is to be controlled. A process variable PV associated with the process is measured and compared to a set point value SP. An error value, defined as the difference of the set point and the process value, is supplied as the input to the PID controller, thus forming a feedback loop. The output of the PID controller drives the process. Gain values are applied to the error feedback and determine the damping level of the system. A strongly under-damped system will tend to overshoot the target equilibrium value, while a strongly over-damped system will tend to approach the target equilibrium value very slowly.

One problem with autotuning a PID controller is that typically the autotuning algorithm is "hardwired" to tune the PID controller for an optimum operation such that the system remains stable. In other words, the user has no way of specifying how he/she wants the system to be auto-tuned. This capability would be very desirable in many systems. For example, in the field of motion control there may be different requirements for the control system based on the type of motor/drive and mechanical fixture being controlled. For example, some systems may tolerate overshoot (due to under-damping) up to 50%, while others may only tolerate overshoot up to 10%.

Users can generally describe the characteristics desired in a tuned PID controller in plain English, for example "I want my motor to respond fast, however I cannot tolerate too much overshoot". However, users are generally unable to quantify these characteristics in terms of PID controller gain values to achieve the desired response from their systems.

Thus, it would be desirable for a PID controller autotuning algorithm to be configurable by a user. It would be further desirable for the user to configure the autotuning algorithm through a graphical user interface. Therefore improved systems and methods are desired for user configurable autotuning of PID controllers.

SUMMARY OF THE INVENTION

The present invention comprises various embodiments of a system and method for allowing user configuration of an autotuning algorithm for autotuning a PID controller. The PID control loop includes the PID controller and a process under control. The input of the PID control loop is compared to a process variable supplied by the process. The result of the comparison is supplied to the PID controller, and the PID controller drives the process.

In one embodiment, user input is received indicating a desired characteristic of a PID controller autotuning algorithm. The user input may be received through one or more of a variety of interfaces, including GUI, command line interface, voice recognition, analog or digital controls, handwriting recognition, or any other type of user interface. In a preferred embodiment, a GUI is used to receive the user input. Slider controls may provide the user means to characterize the desired control system, where one slider control specifies system stiffness, ranging from 0 (very stiff) to 1 (very smooth). Another slider control may allow the user to specify response time, ranging from 0 (very slow) to 1 (very fast). It should be noted that as one slider control is moved toward one extreme, the other may automatically move in the opposite direction due to the fact that the specified parameters (stiffness and response time) vary inversely to one another.

The system may be excited via a proportional controller (P-controller) to characterize the intrinsic behavior of the system, i.e., to calculate a system transfer function, which codifies the undamped system behavior in response to a standard stimulus. The user may then provide input indicating a desired characteristic of the PID autotuning algorithm as described above. An autotuning algorithm, such as Ziegler-Nichols technique, may then be configured or modified in accordance with the user input. In other words, the received user input characterizing the desired behavior of the control system is used to generate parameters of the autotuning algorithm, and these parameters are then applied to the autotuning algorithm to configure the algorithm for the specified characteristics.

The configured autotuning algorithm may be applied to the transfer function mentioned above to generate gain values or PID controller parameters for the PID controller. These gain values, when applied to the PID controller, may result in the PID controller characteristics or behavior specified by the user.

Finally, the PID controller parameters (gains) are loaded into the PID controller hardware (or software), thereby configuring the PID controller to operate according to the desired characteristics specified by the user.

After the PID controller has been configured by the method described above, the user may optionally trigger and view a step response of the system to review the actual results of the tuning process. If the step response of the system is determined to be inadequate for the user's purposes, the user may repeat the process described above with different input values to generate and test alternate configurations for the system.

BRIEF DESCRIPTION OF THE DRAWINGS

A better understanding of the present invention can be obtained when the following detailed description is considered in conjunction with the following drawings, in which.

While the invention is susceptible to various modifications and alternative forms, specific embodiments are shown by way of example in the drawings and will herein be described in detail. It should be understood however, that drawings and detailed descriptions thereto are not intended to limit the invention to the particular forms disclosed. But on the contrary the invention is to cover all modifications, equivalents and alternatives following within the spirit and scope of the present invention as defined by the appended claims.

DETAILED DESCRIPTION OF THE PREFERRED EMBODIMENT

Incorporation by Reference

U.S. Pat. No. 6,081,751 titled "System and Method for Closed Loop Autotuning of PID Controllers" whose inventors are Rongfu Luo, S. Joe Qin, and Dapang Chen, and which issued on Jun. 27, 2000, is hereby incorporated by reference in its entirety as though fully and completely set forth herein.

Figure 1A:
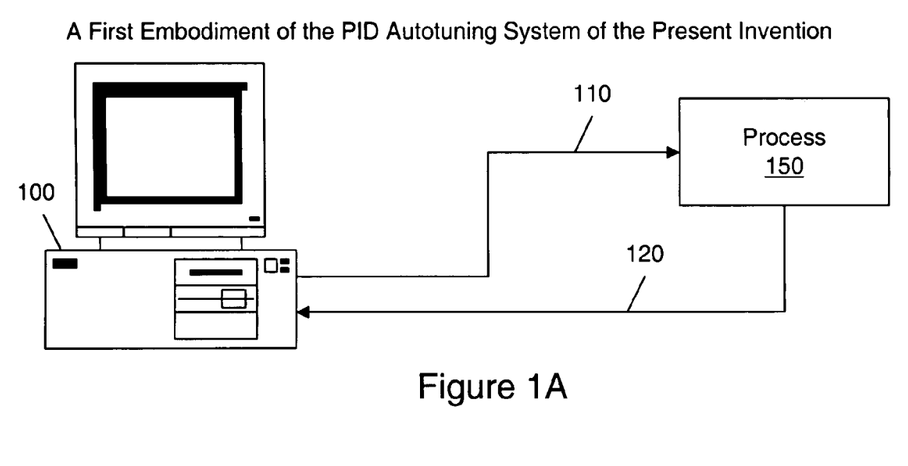
FIG. 1A illustrates a first embodiment of the system of the present invention which includes a computer and a process.
Figure 1B:
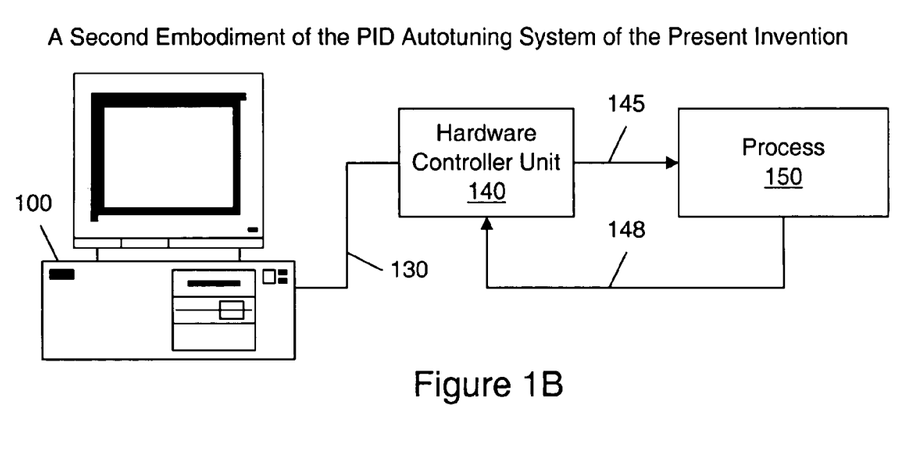
FIG. 1B illustrates a second embodiment of the system of the present invention which includes a computer, a process, and an external hardware controller unit.

FIGS. 1A and 1B: PID Autotuning Systems

FIG. 1A illustrates a first embodiment of the system of the present invention which includes a computer 100, and process 150. Computer 100 supplies actuating signals to the process 150 through actuating bus 110. It is noted that a D/A conversion device (not shown) is preferably included in this embodiment to convert the actuating signals from a digital form to an analog form. Furthermore, computer 100 senses the process variable PV through measurement bus 120. Data acquisition logic (not shown) such as an A/D conversion device is preferably employed to convert the process variable from analog to digital form. Thus, computer 100 operates on a stream of samples of the process variable (PV).

In one embodiment, the PID controller may be implemented in software, i.e., a PID controller program, which may be stored in a memory of the computer 100, and executed by a processor comprised on the computer 100. An autotuning algorithm may also be implemented in software, i.e., in an autotuning program, stored and executed on computer 100. In one embodiment, the autotuning software may include a user interface which allows the user to provide input to the system which may be used to modify or configure the autotuning algorithm. Therefore, the autotuning program may be executable to configure the PID controller software in accordance with desired characteristics specified by the user. Further details of the autotuning process are described below with reference to FIG. 3. In one embodiment, one or both of the PID controller and the autotuning algorithm may be implemented in programmable logic, such as a field programmable gate array (FPGA).

FIG. 1B illustrates a second embodiment of the system of the present invention which includes computer 100, process 150, and external hardware controller unit 140, e.g. PID controller. Thus hardware controller unit 140 may implement the PID controller, either in software or in programmable logic. Computer 100 is coupled to hardware controller unit 140 through a signal bus 130. Hardware controller unit 140 drives process 150 with actuating signal u through process bus 145. Also, hardware controller unit 140 senses process variable PV through sensing bus 148. Hardware controller 140 preferably includes an A/D conversion device to convert the process variable received via sensing bus 148 from analog to digital form.

In this second embodiment of the present invention, the computer 100 sends a setpoint signal SP, which is the target equilibrium value of the process variable PV to the hardware controller unit 140 through signal bus 130. The hardware controller unit 140 performs at least a portion of the PID autotuning operations. In other words, in this embodiment, the PID autotuning operations may be performed entirely by the hardware controller unit 140, or by both hardware controller unit 140 and software comprised on the computer 100. Further details of the autotuning process are described below with reference to FIG. 3.

Memory Medium

As mentioned above, in various embodiments, part or all of the autotuning algorithm may be stored on computer 100, i.e., in a memory medium, such as the memory medium comprised on computer 100, or, in an alternate embodiment, stored in a memory medium comprised on the hardware controller unit 140 shown in FIG. 1B. The term "memory medium" is intended to include various types of memory or storage, including an installation medium, e.g., a CD-ROM, or floppy disks, a random access memory or computer system memory such as DRAM, SRAM, EDO RAM, Rambus RAM, EPROM, EEPROM, flash memory etc., or a non-volatile memory such as a magnetic media, e.g., a hard drive, or optical storage. The memory medium may comprise other types of memory as well, or combinations thereof. In addition, the memory medium may be located in a first computer, such as computer 100, in which the programs are executed, or may be located in a second different computer which connects to the first computer over a network. In the latter instance, the second computer provides the program instructions to the first computer for execution. The memory medium may also be a distributed memory medium, e.g., for security reasons, where a portion of the data is stored on one memory medium and the remaining portion of the data may be stored on a different memory medium.

Also, the computer system 100 described above may take various forms, including a personal computer system, mainframe computer system, workstation, network appliance, Internet appliance, personal digital assistant (PDA), or other device. In general, the term "computer system" can be broadly defined to encompass any device having a processor which executes instructions from a memory medium.

The memory medium in one or more of the above systems thus may store a software program and/or data for autotuning the PID controller. A CPU or processing unit in one or more of the above systems executing code and data from a memory medium comprises a means for executing the autotuning software program according to the method or flowchart described below with reference to FIG. 3.

Various embodiments further include receiving or storing instructions and/or data implemented in accordance with the present description upon a carrier medium. Suitable carrier media include memory media as described above, as well as signals such as electrical, electromagnetic, or other forms of analog or digital signals, conveyed via a communication medium such as networks and/or a wireless link.

In one embodiment, the memory medium may also store software which allows user controllable PID autotuning, i.e., which is executable to receive user input which may be used to configure an autotuning algorithm in accordance with operational characteristics specified by the user. In one embodiment, the memory medium may further include software which is executable to display a Graphical User Interface (GUI). The GUI may be operable to receive the user input for configuring the autotuning algorithm/software. In other words, the memory medium may store software which provides an interface to the user for entering configuration information for the autotuning algorithm, possibly in addition to the autotuning software itself. In one embodiment, the GUI may comprise one or more user input controls which are operable to receive user input, including one or more of slider controls, data fields, radio buttons, menus, or any other type of user control which facilitates user input. In one embodiment, the interface software may include voice recognition software which is operable to receive spoken commands and parameters. In another embodiment, the interface software may include handwriting recognition software which is operable to receive written commands and parameters. In an alternate embodiment, the software may simply use a command line interface to receive user input, whereby the user may simply type text commands and numeric values for input.

Figure 2:
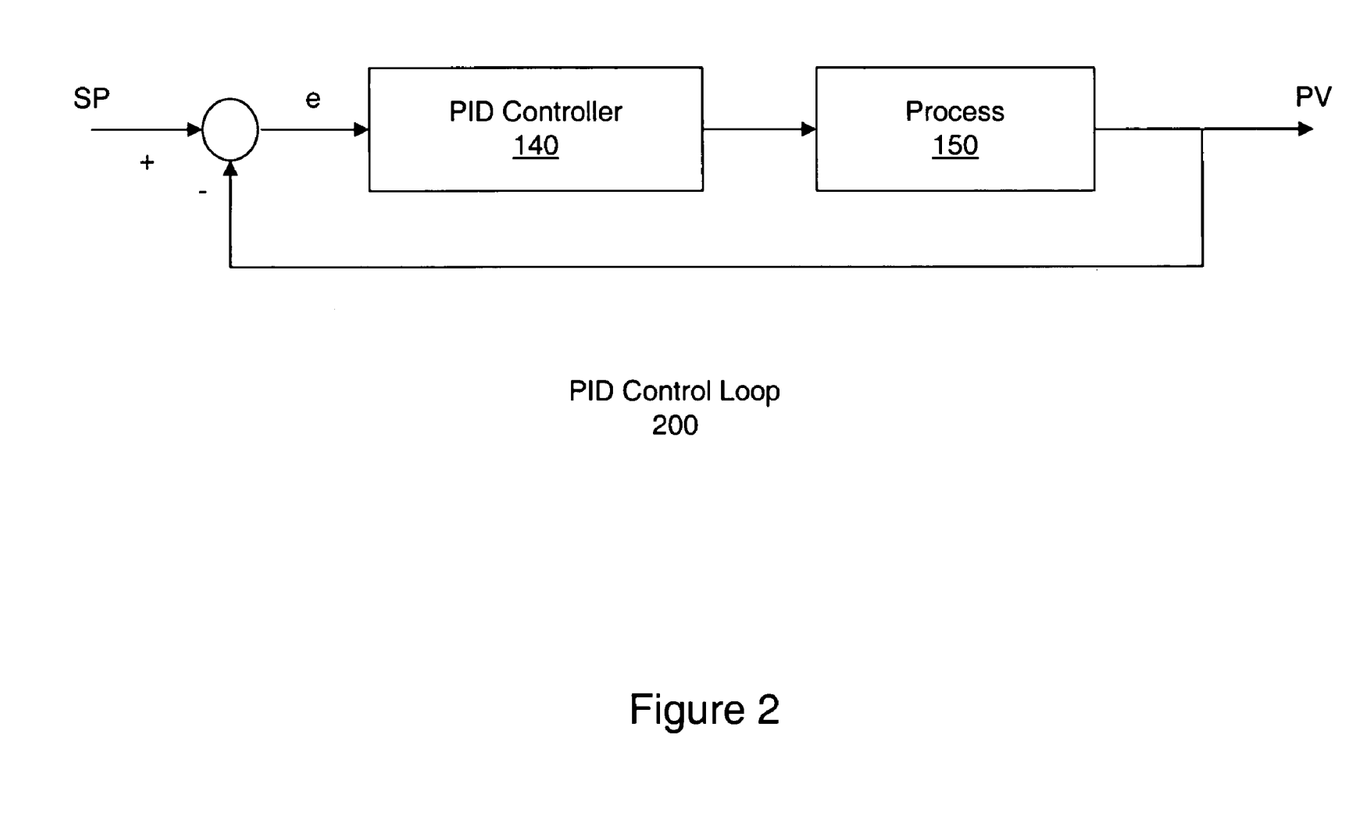
FIG. 2 illustrates a PID control loop, according to one embodiment.

FIG. 2—PID Control Loop

FIG. 2 illustrates the structure of a PID control loop, according to one embodiment. PID control loop 200 includes PID controller 140 and process 150, which is to be controlled. A process variable PV associated with the process 150 is measured and compared to a set point value SP, which is the target equilibrium value of the process variable PV. An error value e, defined as the difference of the set point and the measured process value, is supplied as the input to the PID controller 140, thus forming a feedback loop. The output of the PID controller 140 drives the process 150. Gain values are applied to the error feedback and determine the damping level of the system. A strongly under-damped system will tend to overshoot the target equilibrium value, while a strongly over-damped system will tend to approach the target equilibrium value very slowly.

As mentioned above, the physical or behavior characteristics of different controlled systems may vary greatly, and thus the desired damping characteristics of the respective controllers may vary correspondingly. For example, a large heavy robotic arm has much greater inertia than a small light robotic arm, and so a controller for the large arm may minimize overshooting at the expense of response time, while the controller of the small arm may minimize response time and allow higher overshoot. The propensity of a system to overshoot the equilibrium value is directly related to its "stiffness", i.e., the stiffer a system is, the greater it will tend to overshoot, although response time will generally be greater as well. Conversely, if a system is less stiff, i.e., is more "smooth", then overshoot will be less, but the response time will be less as well. Thus stiffness and response time are complementary or inversely related aspects of a system. This principal applies not only to mechanical systems, but to any dynamic system, including electronic, electrical, chemical, hydrodynamic, thermodynamic, or any other type of controlled system.

A controlled system's physical or behavior characteristics may be codified in a transfer function. Generally, a transfer function describes the characteristic response of a system to standard stimuli. Autotuning methods typically apply an autotuning algorithm, such as the Ziegler-Nichols technique, to a system's transfer function to generate or calculate appropriate gain values for the system controller. These gains may then be applied to the PID controller for operational control of the system. By varying parameter values of the autotuning algorithm in response to user input, gain values may be determined which result in a control system of a desired stiffness, or with a particular response time.

EXAMPLE

An example based upon the above-mentioned Ziegler-Nichols technique applied to a PID controller follows:

In addition to the normal gain values (P, I, and D) of a PID controller, a derivative sample period parameter (Td) is defined. Td is used as a multiplier of the PIED sample period (PID update rate), in a preferred embodiment of the system. For low inertia systems, such as the small light robotic arm mentioned above, Td should be set to a small value so that the derivative is calculated often enough to provide adequate damping for control servo loop stability.

Systems with higher inertia, such as the large heavy robotic arm mentioned above, can benefit from larger values of Td. The higher inertia means that the position error cannot change quickly, and so it is acceptable to calculate the derivative less often. This means a lower value of D may be used with the same effective amount of damping, and the system will be smoother with less torque noise from the derivative term. In higher inertia systems, using a Td of zero, and therefore a larger value for D, simply results in increased torque noise and motor heating without any improvement in system stability.

As mentioned above, Zeigler-Nichols is the most popular method used for PID tuning. This method starts by zeroing the integral (I) and differential (D) gains and then raising the proportional gain (P) until the system is unstable. The value of P at the point of instability is called Kmax and the frequency of oscillation is called fo. Based on Kmax and fo the Ziegler-Nichols method states that the PID gains for a stable system are:

$$P = 0.6 * Kmax$$
$$I = 2.0 * fo$$
$$D = 0.125 / fo$$

The user input comprising the control characteristic is represented by the value d, where the value d is determined from the input control which receives the user input. The control characteristic specified by the user (response time or stiffness factor) is taken into account by modifying these equations as shown below:

$$P=0.7*K\text{max}$$

$$I=P/(0.5*T)$$

where T is the time corresponding to fo $$D=(1*d+5)*P*0.125*T$$

where d is the control type (stiffness factor–ranges from 0 to 1, where 1 indicates 100% smooth and 0 indicates 0% smooth.)

$$Td=5*d+1$$

where Td is the derivative sample period.

These modifications allow the system to be auto-tuned based on the user requirements. More specifically, as shown above, the user-defined value d, which represents the stiffness (or alternatively, the response time) of the control system modifies the standard Ziegler-Nichols equations, producing P, I, D, and Td gain values for the PID controller which result in the desired controller characteristics. One embodiment of the autotuning process is described below with reference to FIG. 3.

Figure 3:
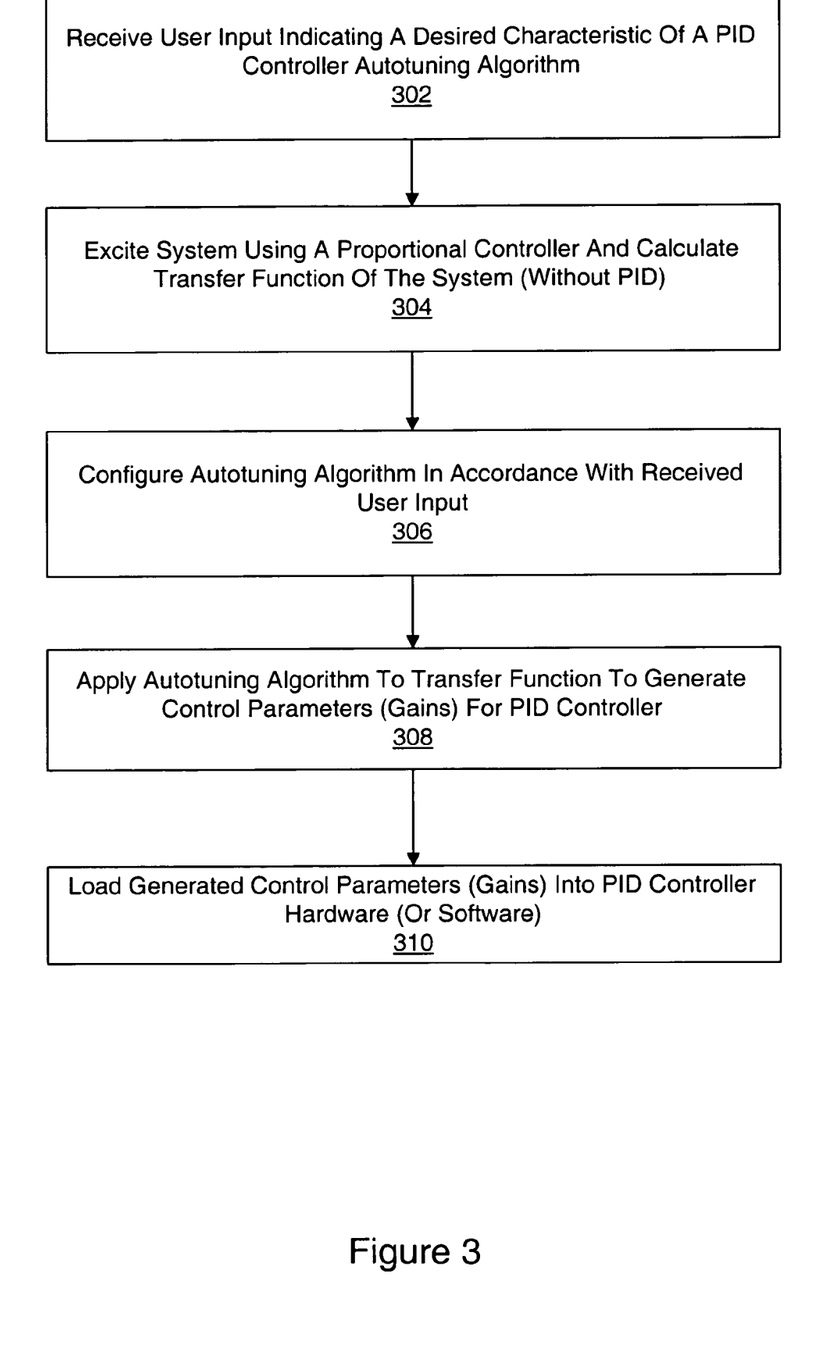
FIG. 3 is a flowchart of an autotuning process, according to one embodiment.

FIG. 3—Flowchart Diagram of an Autotuning Process

FIG. 3 is a flowchart of an autotuning process, according to one embodiment. It should be noted that some of the following process elements may occur in tandem, or in a different order than is shown.

As FIG. 3 shows, in 302 user input is received indicating desired characteristics of a PID controller, or of a PID controller autotuning algorithm. As described above, the user input may be received through one or more of a variety of interfaces, including GUI, command line interface, voice recognition, analog or digital controls, handwriting recognition, or any other type of user interface. In a preferred embodiment, a GUI is used to receive the user input. An example of such an interface is presented below with reference to FIGS. 4–6. In this embodiment, slider controls allow the user to characterize the desired behavior of the control system, where one slider control specifies system stiffness, ranging from 0 (very stiff) to 100% (very smooth). In this embodiment, another slider control specifies response time, ranging from 0 (very slow) to 100% (very fast). It should be noted that as one slider control is moved toward one extreme, the other moves in the opposite direction due to the fact that the specified parameters (stiffness and response time) vary inversely with respect to one another. In one embodiment, the GUI may include graphical icons illustrating the controlled characteristic determined by a user control. For example, for a slider control specifying response time, an icon of a snail may indicate one extreme (slow) of the slider control position/value, while a lightning bolt may indicate the other extreme of the slider control position/value, i.e., the shortest response time. Examples of such icons are shown in FIGS. 4–6.

In 304 the system is excited via a proportional controller to characterize the intrinsic behavior of the system, i.e., to calculate the system transfer function, described above with reference to FIG. 2. It should be noted that in the preferred embodiment, the system is excited only with the proportional controller (the "P" in PID), and not with Integration (I) or Derivative (D) damping.

In 306 the autotuning algorithm, such as Ziegler-Nichols, is configured in accordance with the user input, according to the modified Ziegler-Nichols equations presented above. In other words, the user input received in 302 above which characterizes the desired behavior of the control system is used to generate parameters of the autotuning algorithm, and these parameters are then applied to the autotuning algorithm to configure the algorithm for the specified characteristics.

In 308 the configured autotuning algorithm is applied to the transfer function generated in 304 above to generate gain values or PID controller parameters for the PID controller. These gain values, when applied to the PID controller, may result in the PID controller characteristics specified by the user in 302.

Finally, in 310 the PID controller parameters (gains) are loaded into the PID controller hardware (or software), thereby configuring the PID controller to operate according to the desired characteristics specified by the user in 302.

After the PID controller has been configured by the method described above, the user may optionally trigger and view a step response of the system to review the actual results of the tuning process. Examples of this step are presented below with reference to FIGS. 4–6. If the step response of the system is determined to be inadequate for the user's purposes, the user may repeat the process described above with different input values to generate alternative configurations, and therefore different behaviors, for the system.

In one embodiment, the user may provide user input by "drawing" a desired step response on the display in step 302. In this embodiment, the method determines the appropriate parameters for the PID autotuning algorithm that would tune the PID controller to produce a "closest fit" to the step response drawn by the user, i.e., the method derives the value d, mentioned above, from a curve fit of the user-drawn step response. Thus in 306, the autotuning algorithm (Ziegler-Nichols) is modified in accordance with the determined appropriate parameters, producing a configured autotuning algorithm as used in 308.

FIGS. 4–6: Screen Shots Illustrating One Embodiment of the Autotuning System

FIGS. 4–6 illustrate one embodiment of the system described above. More specifically, FIGS. 4–6 are screen shots of the Graphical User Interface (GUI) and signal traces of step responses corresponding to various configurations of the PID controller.

Figure 4A:
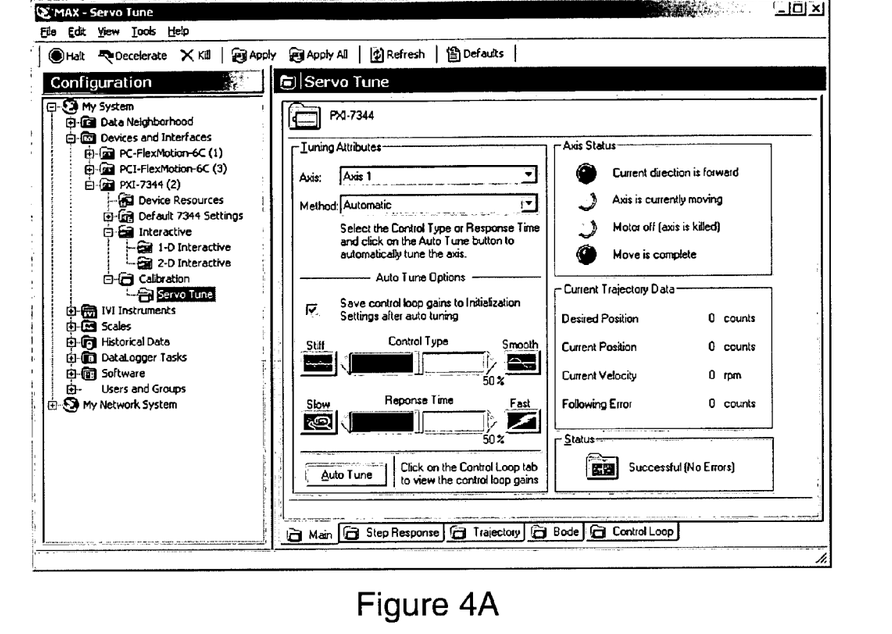
FIGS. 4–6 are screen shots illustrating one embodiment of the autotuning system.

As shown in FIG. 4A, in one embodiment, the GUI includes two slider controls; one specifying "control type", which controls the stiffness of the controller, ranging from 0% (stiff) to 100% (smooth), and the other specifying "response time", which determines the response time of the controller. It should be noted that these two controls are redundant. The stiffness and response time are complementary terms, i.e., they vary inversely to one another, and so selecting a value for one control automatically determines the value of the other control. The use of both controls is intended to present the user with a choice of control terms to accommodate the user's intuition regarding the particular system being controlled, i.e., some system behaviors may be more easily conceptualized in terms of response time, while others may be more easily thought of in terms of stiffness. Note that in this particular screen shot, both slider controls are set at 50%.

As FIG. 4A also shows, in one embodiment, the GUI may further include other features, such as an autotune trigger, axis selection, tuning method, axis status indicators, control parameters (gains) save/store, current trajectory data displays, and system status, among others.

As mentioned above, in one embodiment, the GUI may include graphical icons illustrating the controlled characteristic determined by a user control. As FIG. 4A shows, for the slider control specifying response time, an icon of a snail indicates one extreme (slow) of the slider control position/value, while a lightning bolt indicates the other extreme of the slider control position/value, i.e., the shortest response time. Similarly, as FIG. 4A shows, the slider control which determines control type includes signal icons illustrating stiff and smooth response characteristics indicating to the user the characteristic behavior determined from the slide control setting.

Figure 4B:
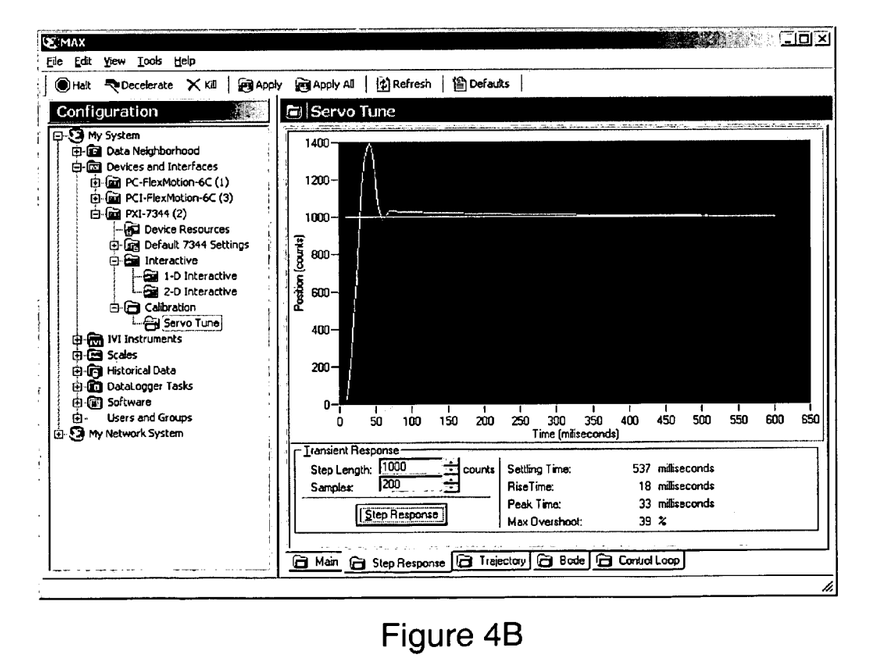

FIG. 4B displays a signal trace of a step response of the system according to the configuration shown in FIG. 4A. As the signal trace of FIG. 4B shows, the step response is characterized by an initial ~40% overshoot of the setpoint (SP) value of 1000, followed by a moderately rapid settling to the setpoint, or equilibrium target value. As FIG. 4B shows, in addition to the signal trace, the display may also include various other data displays, including display of transient response data such as step length, sample count, settling time, rise time, peak time, maximum overshoot, and/or any other useful information. The step response GUI may also include a step response trigger which may operate to trigger a step response, thereby generating the step response signal trace.

Figure 5A:
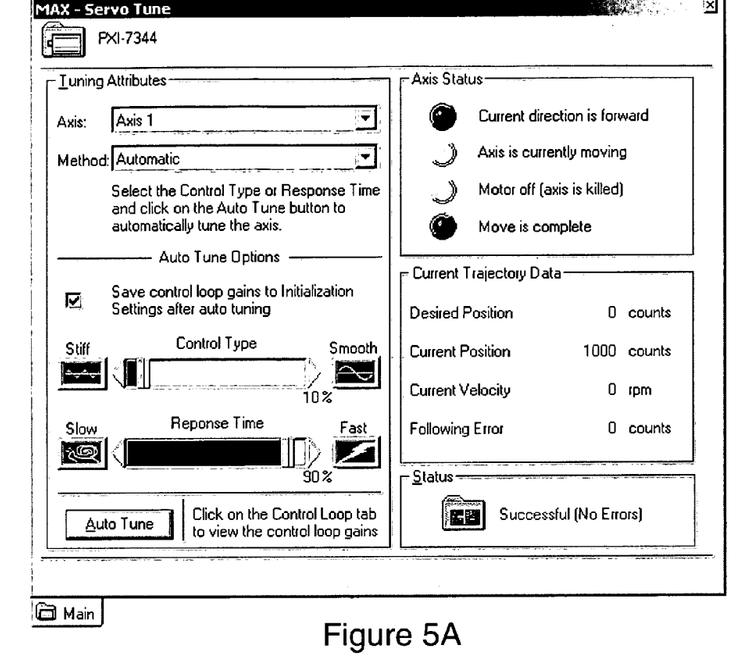

FIG. 5A illustrates the GUI of FIG. 4A with different configuration values. As FIG. 5A shows, in this configuration the control type is set for a stiff control, i.e., the smoothness value is 10%, and so the response time control is set to a corresponding value for a fast response time, i.e., the response is set at 90%. The resulting step response of the system is shown in FIG. 4D, described below.

Figure 5B:
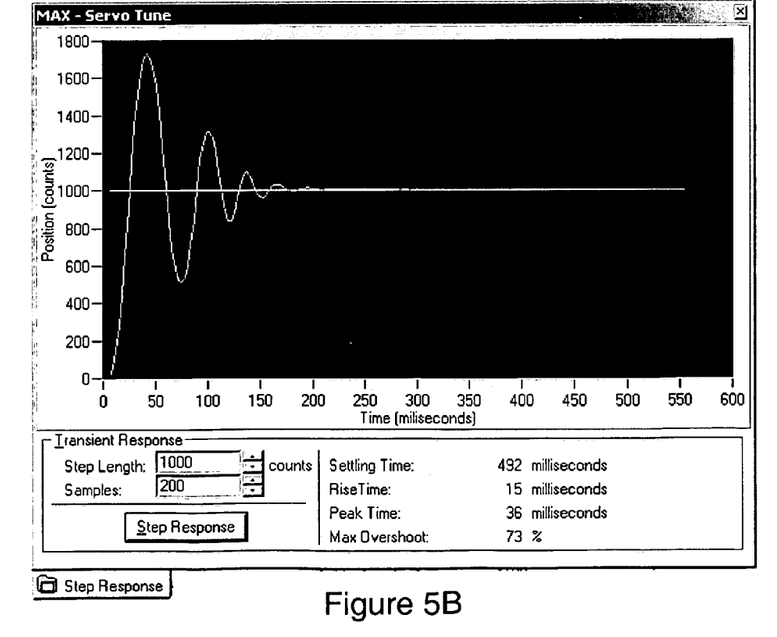

FIG. 5B displays a signal trace of a step response of the system according to the configuration shown in FIG. 5A. As the signal trace of FIG. 4D shows, the step response is characterized by an initial ~70% overshoot of the setpoint (SP) value of 1000, followed by a rapidly diminishing oscillation around the setpoint, or equilibrium target value. Note that in this configuration the system settles to the setpoint more quickly than the system did in FIG. 4B, as expected. Thus, in this configuration, the system controller settings minimize response time (quick response) with a corresponding increase in overshoot (high stiffness).

Figure 6A:
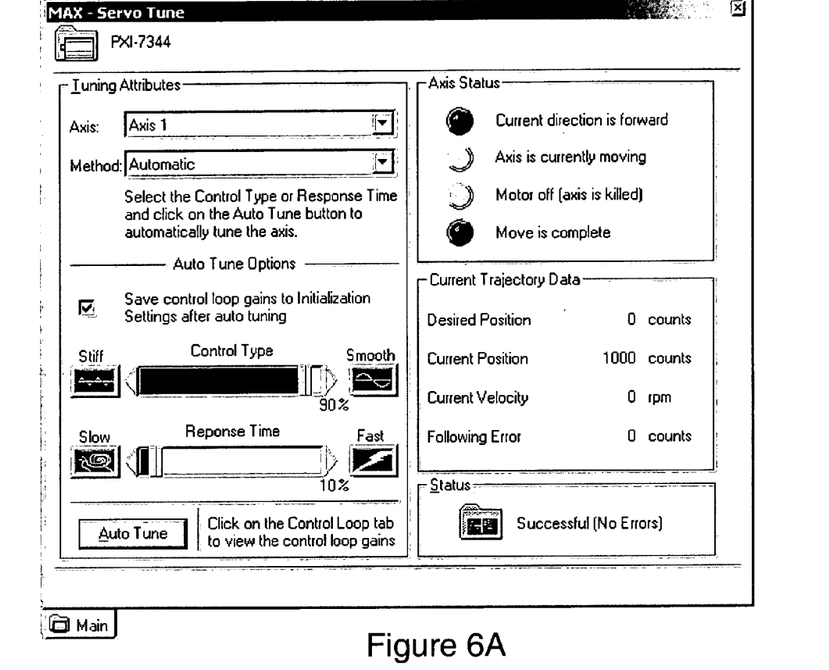

FIG. 6A illustrates the GUI of FIG. 4A with still different configuration values. As FIG. 6A shows, in this configuration the control type is set for a smooth control, i.e., the smoothness value is 90%, and so the response time control is set to a corresponding value for a slow response time, i.e., the response is set at 10%. The resulting step response of the system is shown in FIG. 6B, described below.

Figure 6B:
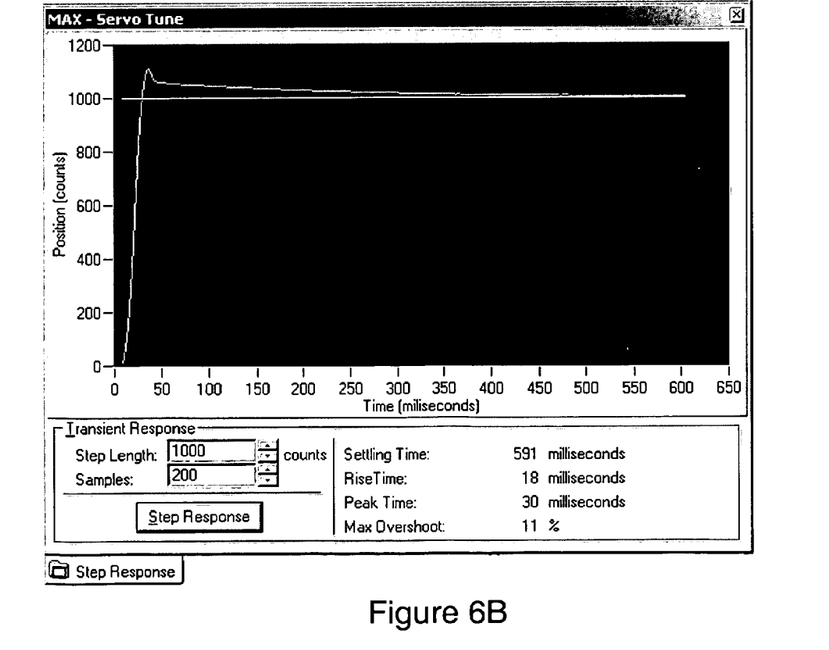

FIG. 6B displays a signal trace of a step response of the system according to the configuration shown in FIG. 6A. As the signal trace of FIG. 6B shows, the step response is characterized by an initial ~10% overshoot of the setpoint (SP) value of 1000, followed by a relatively slow settling to the setpoint. Note that in this configuration the system settles to the setpoint significantly more slowly than the system did in FIG. 4B or FIG. 5B, as expected. Thus, in this configuration, the system controller settings minimize overshoot (less stiffness) at the expense of a quick response time (slow response).

Thus, in various embodiments of the system and method described above, the user may qualitatively specify the operational characteristics of a PID control system by providing input parameters which are used to configure the PID controller autotuning algorithm. Furthermore, the system and method described herein provides a Graphical User Interface which greatly simplifies the process of autotuning a system according to the users needs. This provides for great flexibility in applying PID control to a variety of different systems as compared to prior art autotuning systems and methods.

Although the system and method of the present invention has been described in connection with specific embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method for performing user controllable autotuning of a Proportional-Integral-Derivative (PID) controller, the method comprising:

displaying at least one graphical user input (GUI) element for specifying a desired performance characteristic of a PID controller autotuning algorithm;

receiving user input to the at least one GUI element, wherein the user input comprises a user-drawn step response curve, wherein the user-drawn step response curve indicates the desired performance characteristic of the PID controller autotuning algorithm;

deriving one or more parameter values indicating the desired performance characteristic of the PID controller autotuning algorithm from the user-drawn response curve;

configuring the PID controller autotuning algorithm, wherein said configuring the PID controller autotuning algorithm comprises applying the one or more parameter values to parameters of the PID controller autotuning algorithm, wherein said configuring produces a configured PID controller autotuning algorithm; and executing the configured PID controller autotuning algorithm to tune the PID controller;

wherein the user input indicating the desired performance characteristic indicates a desired operation of the PID controller after execution of the autotuning algorithm, and wherein the desired operation includes one or more of stiffness and response time.

2. The method of claim 1, wherein the PID controller autotuning algorithm executes according to the desired performance characteristic indicated by the user.

3. The method of claim 1, further comprising:

displaying a graphical user interface on a display device, wherein the graphical user interface includes one or more user input controls which are operable to receive the user input indicating the desired performance characteristic of the PID controller autotuning algorithm.

4. The method of claim 3, wherein the one or more user input controls comprise one or more data fields; wherein the one or more data fields are operable to receive respective parameter values indicating the desired performance characteristic of the PID controller autotuning algorithm.

5. The method of claim 1, wherein the user input comprises one or more parameter values indicating the desired performance characteristic of the PID controller autotuning algorithm; and wherein said configuring the PID controller autotuning algorithm comprises applying the one or more parameter values to parameters of the PID controller autotuning algorithm.

6. The method of claim 1, wherein the user input determines a value d, wherein the value d indicates the desired performance characteristic of the PID controller autotuning algorithm; and wherein said configuring the PID controller autotuning algorithm comprises applying the value d to modified Ziegler-Nichols equations:

$P=0.7*K\max,$ where Kmax is a value of P at a point of instability;

$I=P/(0.5*T)$ where T is a time corresponding to fo, where fo is a frequency of oscillation;

$D=(1*d+5)*P*0.125*T$ where d specifies a control characteristic; and $Td=5*d+1$ where Td is a derivative sample period.

7. A computer system for performing user controllable autotuning of a Proportional-Integral-Derivative (PID) controller, the computer system comprising:
a processor;
a memory medium coupled to the processor, wherein the memory medium stores:
  a PID controller autotuning algorithm; and
  a software program operable to configure the PID controller autotuning algorithm in response to user input;
a display device, coupled to the processor and the memory medium, wherein the software program is executable to display at least one graphical user interface (GUI) element for specifying a desired performance characteristic of a PID controller autotuning algorithm on the display device; and
an input device which is operable to receive user input to control the at least one GUI element, wherein the user input comprises a user-drawn step response curve indicating the desired performance characteristic of the PID controller autotuning algorithm;
wherein the software program is operable to:
derive one or more parameter values indicating the desired performance characteristic of the PID controller autotuning algorithm from the user-drawn response curve; and
configure the PID controller autotuning algorithm by applying the one or more parameter values to parameters of the PID controller autotuning algorithm, wherein said configuring produces a configured PID controller autotuning algorithm;
  wherein the processor is operable to execute the configured PID controller autotuning algorithm to tune the PID controller; and
  wherein the user input indicating the desired performance characteristic indicates a desired operation of the PID controller after execution of the autotuning algorithm, and wherein the desired operation includes one or more of stiffness and response time.

8. The computer system of claim 7, further comprising:
a display device coupled to the processor, wherein the display device is operable to display a user interface which is operable to receive the user input indicating a desired performance characteristic of a PID controller autotuning algorithm.

9. The computer system of claim 8,
wherein the user interface comprises a graphical user interface, wherein the graphical user interface includes one or more user input controls which are operable to receive the user input indicating the desired performance characteristic of the PID controller autotuning algorithm.

10. The computer system of claim 7,
wherein the PID controller autotuning algorithm is executable according to the desired performance characteristic indicated by the user.

11. A memory medium comprising program instructions, wherein the program instructions are computer-executable to perform:
displaying at least one graphical user input (GUI) element for specifying a desired performance characteristic of a Proportional-Integral-Derivative (PID) controller autotuning algorithm;
receiving user input indicating the desired performance characteristic of a PID controller autotuning algorithm, wherein the user input comprises a user-drawn step response curve;
deriving one or more parameter values indicating the desired performance characteristic of the PID controller autotuning algorithm from the user-drawn response curve;
configuring the PID controller autotuning algorithm, wherein said configuring the PID controller autotuning algorithm comprises applying the one or more parameter values to parameters of the PID controller autotuning algorithm, wherein said configuring produces a configured PID controller autotuning algorithm;
executing the configured PID controller autotuning algorithm to tune the PID controller;
wherein the user input indicating the desired performance characteristic indicates a desired operation of the PID controller after execution of the autotuning algorithm, and wherein the desired operation includes one or more of stiffness and response time.

12. The memory medium of claim 11,
wherein the PID controller autotuning algorithm executes according to the desired performance characteristic indicated by the user.

13. The memory medium of claim 11, further comprising:
displaying a graphical user interface on a display device, wherein the graphical user interface includes one or more user input controls which are operable to receive the user input indicating the desired performance characteristic of the PID controller autotuning algorithm.

14. The memory medium of claim 13,
wherein the user input comprises one or more parameter values indicating the desired performance characteristic of the PID controller autotuning algorithm; and
wherein said configuring the PID controller autotuning algorithm comprises applying the one or more parameter values to parameters of the PID controller autotuning algorithm.

* * * * *